(12) United States Patent
Epstein

(10) Patent No.: US 12,021,712 B2
(45) Date of Patent: Jun. 25, 2024

(54) CLOUD CONFIGURATION INTERFACE

(71) Applicant: NCR Voyix Corporation, Atlanta, GA (US)

(72) Inventor: Shahar Epstein, Haifa (IL)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/533,182

(22) Filed: Nov. 23, 2021

(65) Prior Publication Data

US 2023/0164038 A1 May 25, 2023

(51) Int. Cl.
| | | |
|---|---|---|
| *H04L 41/5041* | (2022.01) | |
| *G06F 9/455* | (2018.01) | |
| *G06F 9/54* | (2006.01) | |
| *H04L 41/0806* | (2022.01) | |
| *H04L 41/22* | (2022.01) | |

(52) U.S. Cl.
CPC ...... *H04L 41/5045* (2013.01); *G06F 9/45512* (2013.01); *G06F 9/541* (2013.01); *H04L 41/0806* (2013.01); *H04L 41/22* (2013.01)

(58) Field of Classification Search
CPC . H04L 41/5045; H04L 41/22; H04L 41/0893; H04L 41/08; H04L 41/0843; H04L 41/0803; H04L 41/0806; G06F 9/45558; G06F 9/45512; G06F 9/541
See application file for complete search history.

(56) References Cited

U.S. PATENT DOCUMENTS

| | | | | |
|---|---|---|---|---|
| 8,271,653 | B2 * | 9/2012 | DeHaan | H04L 41/0803 709/227 |
| 9,270,530 | B1 * | 2/2016 | Ford | H04L 41/0806 |
| 10,411,975 | B2 * | 9/2019 | Martinez | H04L 41/40 |
| 10,416,996 | B1 * | 9/2019 | Samprathi | G06F 9/541 |
| 10,606,660 | B1 * | 3/2020 | Hartley | G06F 9/5066 |
| 10,972,312 | B2 * | 4/2021 | Bagepalli | H04L 12/6418 |

(Continued)

FOREIGN PATENT DOCUMENTS

| | | | | |
|---|---|---|---|---|
| CN | 105847041 A | * | 8/2016 | |
| WO | WO-2022164754 A1 | * | 8/2022 | H04L 41/22 |

OTHER PUBLICATIONS

E. Hossny, S. Khattab, F. A. Omara and H. A. Hassan, "STAGER: Semantic-Based Framework for Generating Adapters of Service-Based Generic-API for Portable Cloud Applications," in IEEE Transactions on Services Computing, vol. 14, No. 3, pp. 903-914, May 1-Jun. 2021, doi: 10.1109/TSC.2018.2831204. (Year: 2021).*

(Continued)

*Primary Examiner* — Rachel J Hackenberg
(74) *Attorney, Agent, or Firm* — Schwegman Lundberg & Woessner, P.A.

(57) ABSTRACT

A cloud hosting environment configuration interface is provided. Cloud-based services defined in the hosting environment are configured through cloud-based resources using the interface. Previously defined services and their resources can be recalled by reference within the interface and properties and settings for those resources custom modified as needed for a new hosted service. Cloud resources can be added and removed via the interface. In an embodiment, the interface is a Command Line Interface (CLI).

12 Claims, 3 Drawing Sheets

(56) References Cited

U.S. PATENT DOCUMENTS

| | | | | |
|---|---|---|---|---|
| 2011/0314345 | A1* | 12/2011 | Stern | G06F 11/3466 |
| | | | | 718/1 |
| 2017/0006119 | A1* | 1/2017 | Pogrebinsky | G06F 3/0482 |
| 2020/0174899 | A1* | 6/2020 | Ramasamy | H04L 41/0894 |
| 2021/0006467 | A1* | 1/2021 | Aronov | H04L 41/5054 |
| 2022/0413935 | A1* | 12/2022 | Kantamneni | G06F 9/5072 |

OTHER PUBLICATIONS

Robert Pankowecki, "One request can be multiple commands" Nov. 16, 2016, Arkency Blog, pp. 1-9 (Year: 2016).*

* cited by examiner

CLOUD CONFIGURATION INTERFACE

BACKGROUND

Increasingly businesses are offering customer-based services and internal business services through cloud environments. This alleviates the need for a business to purchase, maintain, and continuously update/upgrade hardware resources and software resources. This also reduces the number of technical staff that the business needs to internally employ in support of the services.

As a result, there are a plethora of cloud providers that provide a variety of hardware and software resources for businesses to use within the cloud environment to provide their customer-facing and internally-facing services.

Cloud-provided resources when used by businesses for their customer and internal services require custom configuration before usage for the specific needs of each business. The configuration process, available through Graphical User (GUI) tools or Software Development Kits (SDKs), is laborious and technical adeptness or experience is needed.

It is usually the responsibility of the businesses to have sufficiently trained staff to properly configure the cloud resources using the cloud provider's GUIs or SDKs. The configuration process is lengthy and not user friendly and requires staff with experience in both the business services and the cloud resources. The setup process can also lead to bugs or misconfigurations resulting in unexpected and incorrect behaviors in the business services. Debugging incorrect behaviors in services is difficult when the error was during the configuration process of the cloud resources and when the services do not fail but rather the results of the services are incorrect. In some cases, the configuration errors can result in service failures during which time the service cannot be accessed by the business's customers or internal staff.

As a result, there is a need for improved cloud-resource configuration processes and configuration interfaces for cloud-service setup.

SUMMARY

In various embodiments, a system and methods for providing and operating a cloud configuration interface are presented.

According to an embodiment, a method for operating a cloud configuration interface is provided. An interface is provided that is cloud agnostic. A target cloud provider, cloud resources, and properties and settings for the cloud resources are identified through the interface. An adapter is activated to interact with an Application Programming Interface (API) of the target cloud provider to define and instantiate an instance of a cloud service hosted by the target cloud provider having the cloud resources with the properties and the settings.

DETAILED DESCRIPTION

Figure 1:
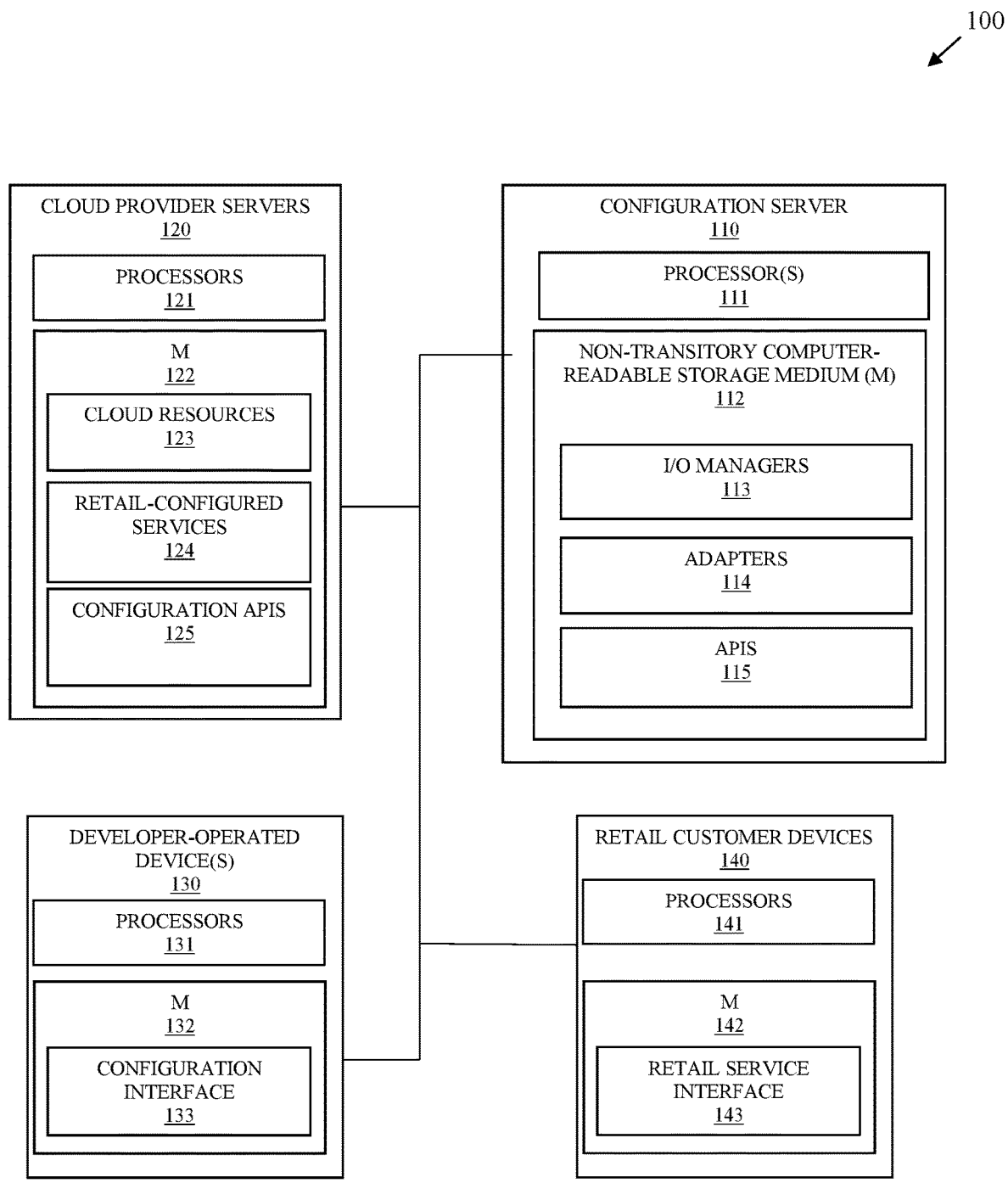
FIG. 1 is a diagram of a system for providing and operating a cloud configuration interface, according to an example embodiment.

FIG. 1 is a diagram of a system/platform 100 for for providing and operating a cloud configuration interface, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing and operating a cloud configuration interface, presented herein and below.

System/platform 100 (herein after just "system 100") provides a processing environment by which developers or analysts can interact and can operate a novel cloud configuration interface. The interface acts as a higher-level interface to disparate cloud providers' configuration GUI tools or configuration SDKs for purposes of custom selecting cloud resources and custom configuring configuration settings for those cloud resources. The novel cloud interface is cloud-provider neutral meaning that the syntax and semantics used within the novel cloud interface is independent of each of the disparate syntaxes and semantics required by each individual cloud provider's GUI tools or SDKs. Moreover, common settings on the resources may be set with single commands, such that a single interface statement using a pre-defined command is capable of causing multiple configuration settings or commands to be processed on one or more of the cloud resources of any designated cloud provider.

The novel interface comprises two main components, an Input/Output (I/O) manager that interacts with the developer/analyst through user input into the interface and Adapters that interrupt and translate the user input into the appropriate Application Programming Interface (API) calls for interaction with the appropriate cloud provider's configuration tools to configure that provider's cloud resources.

Thus, when a developer or an analyst is setting up a hosted environment within one or more cloud environments of one or more cloud providers for a business's service, the developer/analyst can use a syntax and semantics that are independent of the cloud providers' syntaxes and semantics and can perform multiple configuration settings on multiple cloud resources through a single input statement provided to the I/O manager. Cloud setup of the business service is more efficient, requires less technical aptitude, reduces mistakes that can result in failures or incorrect behaviors of the service, and results in a faster setup of the hosted environment than what is conventionally possible through existing cloud providers' GUI tools and SDKs.

As used herein, the terms "user," "developer," and/or "analyst," may be used interchangeably and synonymously herein and below. This refers to an individual who is operating a user-operated device and interacting (providing input and receiving feedback) with the novel interface for purposes of configuring a cloud hosted resources of a given business service.

The term and phrase "resource" and/or "cloud resource" refers to hardware (computing devices, memory, processor, storage, etc.) and/or software (applications, programs, functions, etc.) hosted in a cloud environment. A "service" is an organized collection of one or more resources designed to perform operations based on input data (manually supplied or automatically obtained through another service or a resource) and provide output based on the input data.

A "hosted environment," a "cloud environment," and/or a "cloud" refers to a collection of one or more hardware servers that logically cooperate as a single referenced environment over a network connection to process the resources and the services.

The system 100 comprises a configuration server 110, cloud provider servers 120, one or more developer devices 130 and retail customer devices 140.

Configuration server 110 comprises at least one processor 111 and a non-transitory computer-readable storage medium 112. Medium 112 comprises executable instructions for I/O managers 113, adapters 114, and APIs 115. The executable instructions when provided to processor 111 from medium 112 cause the processor 111 to perform operations discussed herein and below with respect to 113-115.

Each cloud provider server 120 comprises at least one processor 121 and a non-transitory computer-readable storage medium 122. Medium 122 comprises executable instructions for cloud resources 123, retail-configured services 124, and configuration APIs 125. The executable instructions when provided to processor 121 from medium 122 cause the processor 121 to perform operations discussed herein and below with respect to 123-125.

Each developer-operated device 130 comprises at least one processor 131 and a non-transitory computer-readable storage medium 132. Medium 132 comprises executable instructions for a configuration interface 133. The executable instructions when provided to processor 131 from medium 132 cause the processor 131 to perform operations discussed herein and below with respect to 133.

Each retail customer device 140 comprises at least one processor 141 and a non-transitory computer-readable storage medium 142. Medium 142 comprises executable instructions for a retail service interface 143. The executable instructions when provided to processor 141 from medium 142 cause the processor 141 to perform operations discussed herein and below with respect to 143.

It is noted that configuration server 110 may itself be part of a cloud.

During a configuration session between a user and configuration server 110 through interface 133, the user provides input data that creates (instantiates an instance of) one or more resources for a hosted environment of a given retail service and places hardware requirements (minimums and/or maximums) that are needed in terms of hardware resources for a target cloud provider server 120 (such as at least 8 GB of memory, a GB of network bandwidth, 2000 simultaneous network connections for retail customer devices 140, 256 GB of storage, processor access time/cycle time and/or strength 1 GHz, multiple processors for parallel processing, etc.). This is provided either through user statements of a single command or multiple commands entered by the user as input data or by the user referencing a known hardware configuration label that comprises all the hardware requirements needed for supporting or providing a given retail service of a given retailer. The requirements for the hardware resources needed for the hosted environment of the retail service may also be referred to as properties. A specific orchestrator resource (software resource) may be referenced to set/create/reserve the hardware properties by the user through the input data.

An I/O manager 113 instance is activated for the configuration session by configuration server 110 for purposes of identifying the input data provided by the user, such as input data associated with an orchestrator resource name and any provided or overridden (from defaults) hardware properties needed of a target cloud provider server 120. The syntax and semantics associated with the user providing the orchestrator resource name and any overridden hardware properties is independent of any specific cloud provider server 120.

In a similar manner I/O manager 113 and during the configuration session, the user can create/instantiate specific software resources for the hosted environment that are going to be processed within the hosted environment for the retail service through statements and commands entered through the configuration interface. The user can select/enter known reference names for known software resources with known default settings and/or known software resource names with selective overridden settings that change the known default settings for the retail service being provided from the hosted environment.

The user input data can include hardware properties for needed hardware resources of the hosted environment and software settings for needed software resources that are to process in the hosted environment for the retail service. Once this input is received, an architecture for the retail configured service 124 is defined for a target cloud provider server 120.

The I/O manager 113 instance for the configuration session validates user input data for syntax and semantic structure defined in a generic programming language schema or grammar for configuration interface 133. Any syntactical or semantical errors detected, such as an orchestrator reference name or software resource name that is unknown to I/O manager 113 is flagged and the user is provided feedback through interface 133 indicating what triggered the error (e.g., unknown resource reference along with the user-inputted orchestrator name or software resource name provided by the user). Each validated input statement of the session is stored as a definition for the retail-configured service 124 for access by adapters 114.

At the start of a configuration session, the user selects or enters and identifier for the cloud provider that the retail-configured service 124 is to be set up for hosting. This allows the I/O manager 113 instance to identify the appropriate adapter 114 for the session that will issue commands for defining the hosting environment within the target cloud provider servers 120. Validated commands received during the session are passed by the I/O manager 113 instance to the appropriate target cloud provider adapter 114.

Based on the target cloud provider for the session, an Adaptor 114 is processed to translate the syntax and semantics of the session into commands recognized by the target cloud provider. Each translated statement from the session is sent via a corresponding API 115 to that provider's corresponding configuration API 125 as commands. The configuration API 125 receives that commands and processes them to create and to instantiate the resources 123 for the corresponding retail-configured service 124 within the target cloud provider's servers 120.

Each adaptor 114 is specific to a given cloud provider and its configuration API 125.

Once the retail-configured service 124 is instantiated within the target cloud provider servers 120, a retail customer of the retailer can operate any retail customer device 140 using retail service interface 143 and interact with the retail-configured service 124.

In an embodiment, configuration interface 133 is a Command Line Interface (CLI), such that each statement (resource name, property/settings, etc.) during the session is entered by the user.

In an embodiment, configuration interface 133 is a GUI, such that menu options and selection for resource names, default properties/settings, etc. can be presented as selectable options by the user during the session.

In an embodiment, configuration interface 133 is both a CLI and a GUI, such that the user can manually enter statements for the session via a command line and/or select resource names (properties/settings) via window presented menus.

In an embodiment, the cloud providers can be any custom cloud provider, Microsoft® Azure®, Amazon® Web Services®, and/or Google® Cloud Platform®.

In an embodiment, a configuration session can be processed for purposes of dynamically changing properties on hardware resources for a given retail service 124 of a given cloud provider and/or changing settings on software resources for the given retail service 124 of the given cloud provider.

In an embodiment, each adaptor 114 is configured to issue appropriate commands via API 114 to configuration API 125 of a given retail service 124 on a given cloud provider for purposes of creating or instantiating resources 123, changing properties and/or settings of resources 123, obtaining current states of the service's resources 123, and/or deleting resources 123.

In an embodiment, a configuration session may entail obtaining a given reference name for retail-configured service 124 instance on a first cloud provider server 120, modifying or not modifying existing resource properties and settings of resources 123, selectively adding new resources 123, selectively deleting existing resources 123, and/or instantiating the modified or unmodified retail-configured service 124 as a different instance on a second and different cloud provider server 120.

In an embodiment, a configuration session may entail obtaining a given reference name for retail-configured service 124 instance on a first cloud provider server 120 and modifying resources 124 (changing properties/settings, adding new resources 123, and/or deleting resources 123) and saving the configuration session as a different retail-configured service 124 on the same first cloud provider server.

In an embodiment, the configuration session is provided as a guided setup wizard through configuration interface 133 that includes both a CLI and a GUI.

In an embodiment, the resources 123 comprise machine-learning algorithms, computer-vision applications, security applications, transaction applications, auditing applications, etc.

One now appreciates how system 100 permits rapid cloud hosting customization for retail-configured services 124 utilizing configuration interface 133 along with I/O managers 113, adapters 114, and APIs 115. Instead of developers manually configuring each needed cloud resource 123 for each needed service 124; developers can simply modify previously defined resources 123 and properties/settings from a previously created service 124 in a few short statements via interface 133 and quickly instantiate a new custom service 124. Moreover, the service 124 can be ported and instantiated in an entirely different cloud provider from an original hosting cloud provider without changing the syntax and semantics of the original configuration session since adapters 114 provide the portability features.

Figure 2:
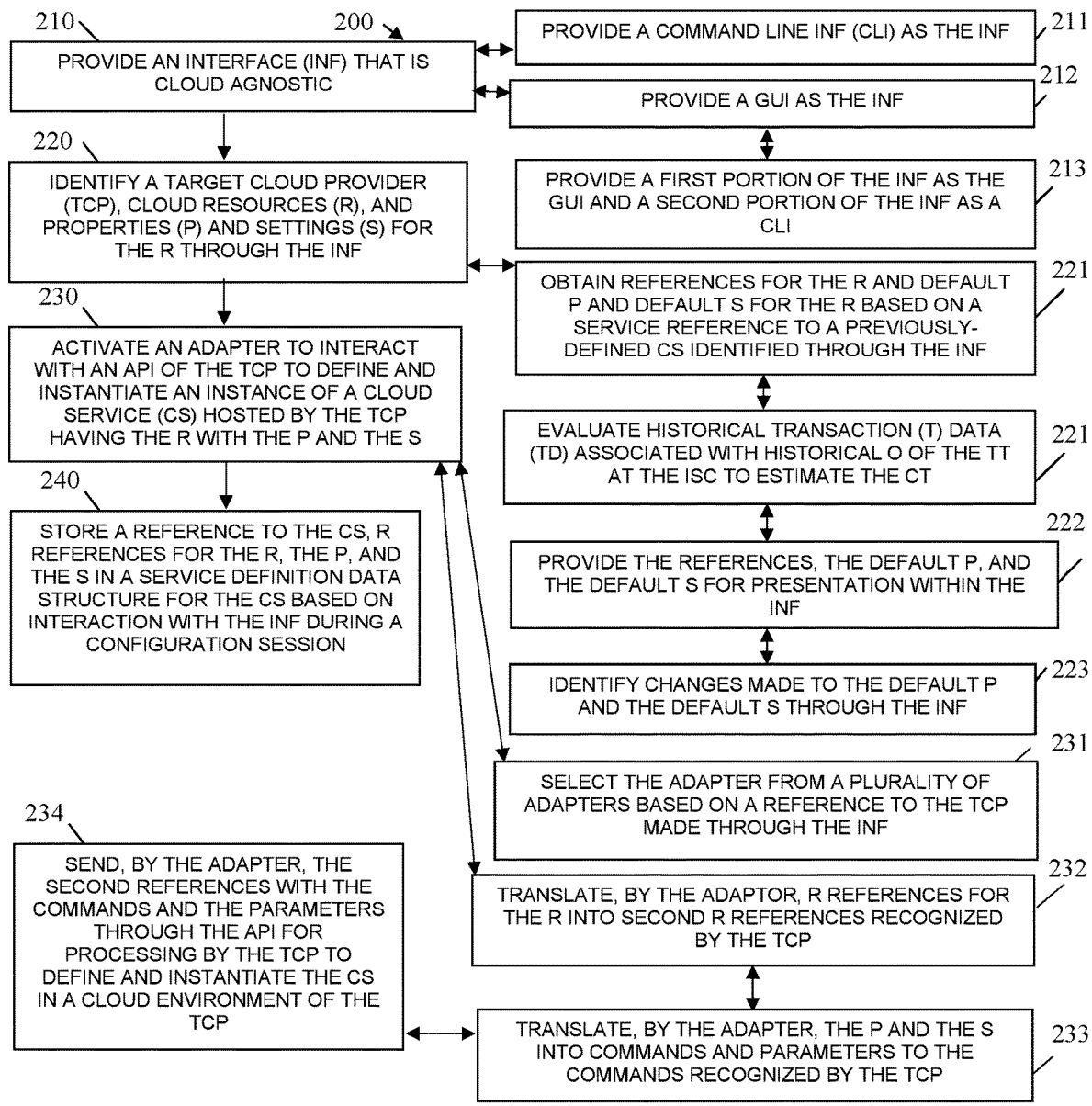
FIG. 2 is a diagram of a method for providing a cloud configuration interface, according to an example embodiment.
Figure 3:
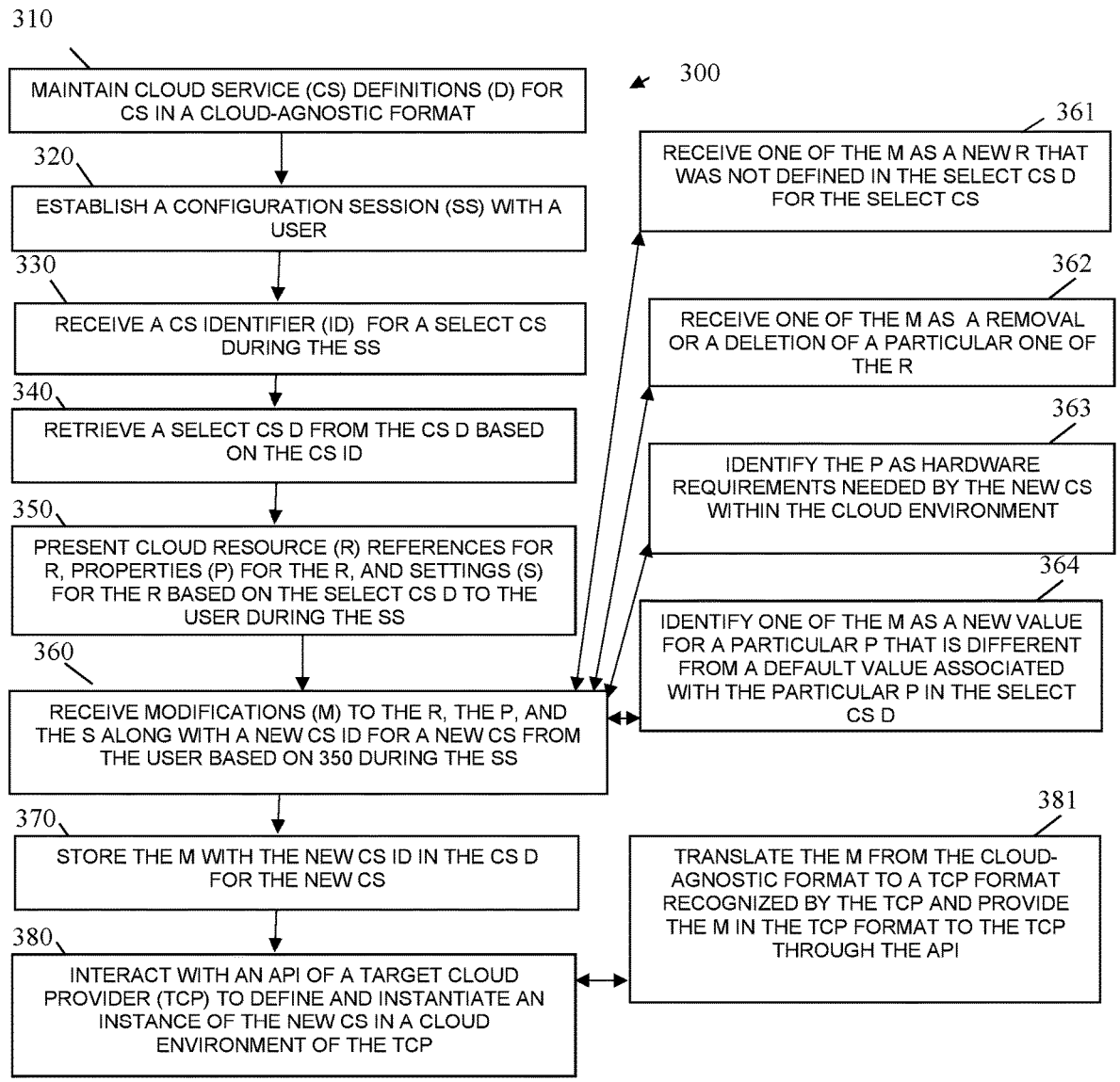
FIG. 3 is a diagram of another method for operating a cloud configuration interface, according to an example embodiment.

The above-referenced embodiments and other embodiments are now discussed within FIGS. 2-3.

FIG. 2 is a diagram of a method 200 for providing a cloud configuration interface, according to an example embodiment. The software module(s) that implements the method 200 is referred to as a "cloud service configuration manager." The cloud service configuration manager is implemented as executable instructions programmed and residing within memory and/or a non-transitory computer-readable (processor-readable) storage medium and executed by one or more processors of one or more devices. The processor(s) of the device that executes the cloud service configuration manager are specifically configured and programmed to process the cloud service configuration manager. The cloud service configuration manager may have access to one or more network connections during its processing. The network connections can be wired, wireless, or a combination of wired and wireless.

In an embodiment, the device that executes the cloud service configuration manager is server 110. In an embodiment, server 110 is one of several servers logically cooperating as a single server within a cloud.

In an embodiment, the cloud service configuration manager is all or some combination of 113, 114, 115, and/or 133.

At 210, the cloud service configuration manager provides or renders an interface 133 that is cloud agnostic to a device 130 operated by a user/developer/analyst.

In an embodiment, at 211, the cloud service configuration manager provides a CLI as the interface.

In an embodiment, at 212, the cloud service configuration manager provides a GUI as the interface.

In an embodiment of 212 and at 213, the cloud service configuration manager provides a first portion of the interface as the GUI and a second portion of the interface as a CLI.

At 220, the cloud service configuration manager identifies a target cloud provider, cloud resources, properties for the cloud resources, and settings for the cloud resources through the interface.

In an embodiment, at 221, the cloud service configuration manager obtains references (labels or names) for the cloud resources, default properties for the cloud resources, and default settings for the cloud resources based on a service reference to a previously-defined cloud service identified through the interface.

In an embodiment of 221 and at 222, the cloud service configuration manager provides the references, the default properties, and the default settings for presentation within the interface.

In an embodiment of 222 and at 223, the cloud service configuration manager identify changes made to the default properties and the default settings through the interface.

At 230, the cloud service configuration manager activates an adapter 114 to interact with an API 125 of the target cloud provider to define and instantiate an instance of a cloud service 124 hosted by the target cloud provider having the cloud resources with the properties and the settings.

In an embodiment, at 231, the cloud service configuration manager selects the adapter 114 from a plurality of adapters 114 based on a reference to the target cloud provider made through the interface.

In an embodiment, at 232, the adapter translates cloud resource references for the cloud resources into second cloud resource references recognized by the target cloud provider.

In an embodiment of 232 and at 233, the adapter translates the properties and the settings into commands and parameters to the commands recognized and processed by the target cloud provider.

In an embodiment of 233 and at 234, the adapter sends the second references with the commands and the parameters through the API for processing by the target cloud provider to define and instantiate the cloud service 124 in a cloud environment of the target cloud provider.

In an embodiment, at 240, the cloud service configuration manager stores a reference to the cloud service, cloud resource references for the cloud resources, the properties, and the settings in a cloud service definition data structure for the cloud service based on interaction with the interface 133 during a configuration session.

FIG. 3 is a diagram of another method 300 for operating a cloud interface, according to an example embodiment. The software module(s) that implements the method 300 is referred to as a "cloud service configuration interface." The cloud service configuration interface is implemented as executable instructions programmed and residing within memory and/or a non-transitory computer-readable (processor-readable) storage medium and executed by one or more processors of a device. The processors that execute the cloud service configuration interface are specifically configured and programmed for processing the cloud service configuration interface. The cloud service configuration interface may have access to one or more network connections during its processing. The network connections can be wired, wireless, or a combination of wired and wireless.

In an embodiment, the device that executes the cloud service configuration interface is server 110. In an embodiment, the server 110 is a one of a collection of multiple servers cooperating as a single server 110 for a cloud.

In an embodiment, the cloud service configuration interface is all of or some combination of 113, 114, 115, 133, and/or method 200.

The cloud service configuration interface presents another and, in some ways, and enhanced processing perspective from that which was discussed above with server 110 and method 200, discussed above with FIGS. 1 and 2, respectively.

At 310, the cloud service configuration interface maintains cloud service definitions for cloud services in a cloud-agnostic format (a format that is not specific to any given cloud provider and a format that is independent of any given cloud provider's required format (syntax and semantics)).

At 320, the cloud service configuration interface establishes a configuration session with a user through a user-facing interface 133.

At 330, the cloud service configuration interface receives a cloud service identifier for a select cloud service during the configuration session.

At 340, the cloud service configuration interface retrieves a select cloud service definition from the cloud service definitions based on the cloud service identifier.

At 350, the cloud service configuration interface presents cloud resource references for cloud resources, properties for the cloud resources, and settings for the cloud resources based on the select cloud service definition to the user during the configuration session.

At 360, the cloud service configuration interface receives modifications to the cloud resources, the properties, and the settings along with a new cloud service identifier for a new cloud service from the user based on 350 during the configuration session.

In an embodiment, at 361, the cloud service configuration interface receives one of the modifications as a new cloud resource that was not defined in the select cloud service definition for the select cloud service.

In an embodiment, at 362, the cloud service configuration interface receives one of the modifications as a removal or a deletion of a particular one of the cloud resources.

In an embodiment, at 363, the cloud service configuration interface identifies the properties as hardware requirements needed by the new cloud service within the cloud environment.

In an embodiment, at 364, the cloud service configuration interface identifies one of the modifications as a new value for a particular property that is different from a default value associated with the particular property in the select cloud service definition.

At 370, the cloud service configuration interface stores the modifications with the new cloud service identifiers in the cloud service definitions for the new cloud service.

At 380, the cloud service configuration interface interacts with an API of a target cloud provider to define and to instantiate an instance of the new cloud service in a cloud environment of the target cloud provider.

In an embodiment, at 381, the cloud service configuration interface translates the modifications from the cloud-agnostic format to a target cloud provider format recognized by the target cloud provider and the cloud service configuration interface provides the modifications in the target cloud provider format to the target cloud provider through the API.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   providing an interface that is cloud agnostic;
   identifying a target cloud provider, cloud resources, and properties and settings for the cloud resources through the interface; and
   activating an adapter to interact with an Application Programming Interface (API) of the target cloud provider to define and instantiate an instance of a cloud service hosted by the target cloud provider having the cloud resources with the properties and the settings for the cloud resources, wherein a single interface statement provided through the interface causes the adapter to interact with the target cloud provider through the API to set multiple ones of the properties and settings on the cloud resources of the cloud provider, wherein the properties and settings at least include minimum and maximum hardware requirements to set on the cloud resources, wherein the hardware requirements include memory requirements, bandwidth requirements, simultaneous network connection requirements, processor cycle time requirements, and parallel processing requirements, wherein the memory requirements include a minimum of 8 GB of memory, the simultaneous network connection requirements include a minimum of 2000 simultaneous network connections, and the processor cycle time requirements include a minimum cycle time 1 GHz.

2. The method of claim 1, wherein providing further includes providing a Command Line Interface (CLI) as the interface.

3. The method of claim 1, wherein providing further includes providing a Graphical User Interface (GUI) as the interface.

4. The method of claim 3, wherein providing further includes providing a first portion of the interface as the GUI and a second portion of the interface as a Command Line Interface (CLI).

5. The method of claim 1, wherein identifying further includes obtaining references for the cloud resources and default properties and default settings for the cloud resources based on a service reference to a previously-defined cloud service identified through the interface.

6. The method of claim 5, wherein obtaining further includes providing the references for the cloud resources, the default properties and the default settings for presentation for the cloud resources within the interface.

7. The method of claim 6, wherein providing the references for the cloud resources further includes identifying changes made to the default properties and the default settings for the cloud resources through the interface.

8. The method of claim 1, wherein activating further includes selecting the adapter from a plurality of available adapters based on a reference to the target cloud provider made through the interface.

9. The method of claim 1, wherein activating further includes translating, by the adapter, resource references for the cloud resources into second resource references recognized by the target cloud provider.

10. The method of claim 9, wherein translating further includes translating, by the adapter, the properties and the settings into commands and parameters recognized by the target cloud provider.

11. The method of claim 10, wherein translating further includes, sending, by the adapter, the second references with the commands and the parameters through the API for processing by the target cloud provider to define and instantiate the cloud service in a cloud environment of the target cloud provider.

12. The method of claim 1 further comprising, storing a reference to the cloud service, cloud resource references for the cloud resources, the properties and the settings for the cloud resources in a service definition data structure for the cloud service based on interaction with the interface during a configuration session.

* * * * *